United States Patent
Nissen Lund et al.

(10) Patent No.: US 11,547,122 B2
(45) Date of Patent: Jan. 10, 2023

(54) PREVENTING PHYSICAL INSTABILITY OF HEAT TREATED DAIRY BASED PRODUCTS

(71) Applicant: ARLA FOODS AMBA, Viby J (DK)

(72) Inventors: Marianne Nissen Lund, Søborg (DK); Colin Andrew Ray, Vintrie (SE); Valentin Rauh, Aarhus C (DK); Sandra Stolzenbach Wæhrens, Gentofte (DK)

(73) Assignee: ARLA FOODS AMBA, Viby J (DK)

( * ) Notice: Subject to any disclaimer, the term of this patent is extended or adjusted under 35 U.S.C. 154(b) by 0 days.

(21) Appl. No.: 16/640,647

(22) PCT Filed: Aug. 23, 2018

(86) PCT No.: PCT/EP2018/072795
§ 371 (c)(1),
(2) Date: Feb. 20, 2020

(87) PCT Pub. No.: WO2019/038392
PCT Pub. Date: Feb. 28, 2019

(65) Prior Publication Data
US 2020/0352185 A1    Nov. 12, 2020

(30) Foreign Application Priority Data
Aug. 23, 2017   (EP) .................................... 17187502

(51) Int. Cl.
*A23C 3/02*   (2006.01)
(52) U.S. Cl.
CPC ............ *A23C 3/02* (2013.01); *A23C 2240/15* (2013.01)

(58) Field of Classification Search
CPC ............................. A23C 3/02; A23C 2240/15
USPC ........................................................ 426/334
See application file for complete search history.

(56) References Cited

U.S. PATENT DOCUMENTS

| 2012/0015082 A1 | 1/2012 | Holst |
| 2012/0058240 A1* | 3/2012 | Ablett ....................... A23L 2/66 426/580 |
| 2018/0153184 A1* | 6/2018 | Ur Rehman ............. A23C 1/16 |

FOREIGN PATENT DOCUMENTS

| CN | 101026963 A | 8/2007 |
| CN | 103181414 | 7/2013 |
| CN | 103503998 | 1/2014 |
| WO | WO 2006/065738 | 6/2006 |
| WO | WO 2009/072885 A1 | 6/2009 |
| WO | WO 2013/012313 | 1/2013 |
| WO | WO 2015/126716 | 8/2015 |

(Continued)

OTHER PUBLICATIONS de Kort et al., "Effect of calcium chelators on heat coagulation and heat-induced changes of concentrated micellar casein solutions: The role of calcium-ion activity and micellar integrity." International Dairy Journal Oct. 2012, 26(2): 112-119.

(Continued)

*Primary Examiner* — Brent T O'Hern
(74) *Attorney, Agent, or Firm* — Casimir Jones SC; Lisa Mueller

(57) ABSTRACT

Methods of preventing creaming and age gelation in heat treated dairy based products are provided herein. Heat treated dairy based products are also provided, in which physical instability is prevented.

10 Claims, 4 Drawing Sheets

(56) References Cited

FOREIGN PATENT DOCUMENTS

| WO | WO 2018/102658 | 6/2018 |
|---|---|---|
| WO | WO 2019/038392 A1 | 2/2019 |

OTHER PUBLICATIONS

Ferruzzi & Green, "Analysis of catechins from milk-tea beverages by enzyme assisted extraction followed by high performance liquid chromatography." Food Chemistry 2006, 99(3): 484-491.
Haratifar & Corredig, "Interactions between tea catechins and casein micelles and their impact on renneting functionality." Food Chemistry 2014, 15(143): 27-32.
Indyk et al., "High performance liquid chromatographic analysis of lactose-hydrolysed milk." Food Chemistry Dec. 1996, 57(4): 575-580.
O'Connell et al., "Effects of Tea, Coffee and Cocoa Extracts on the Colloidal Stability of Milk and Concentrated Milk." International Dairy Journal Aug. 1998, 8(8): 689-693.
Bayraktar et al., "Impact of heat treatment and acid gelation on polyphenol enriched milk samples." LWT Oct. 2019, vol. 113, 108282.
Lu et al., "Effects of homogenisation pressures on physicochemical changes in different layers of ultra-high temperature whole milk during storage." Intl. J. Dairy Tech. May 21, 2013, 66(3): 325-332.
Manji & Kakuda, "The Role of Protein Denaturation, Extent of Proteolysis, and Storage Temperature on the Mechanism of Age Gelation in a Model System." J. Dairy Science Jun. 1, 1988, 71(6):1455-1463.
Nieuwenhuijse & Van Boekel, "Protein Stability in Sterilised Milk and Milk Products." Advanced Dairy Chemistry—1 Proteins 2003, pp. 947-974.
O'Connell & Fox, "Effects of phenolic compounds on the heat stability of milk and concentrated milk." J. Dairy Research Aug. 1999, 66(3): 399-407.
Schamberger & Labuza, "Effect of green tea flavonoids on Maillard browning in UHT milk." LWT—Food Science and Technology Oct. 2007, 40(8): 1410-1417.
Extended European Search Report dated Oct. 18, 2017 for European Application No. 17187502.4, 10 pages.
International Search Report and Written Opinion dated Nov. 15, 2018 for Intl. Application No. PCT/EP2018/072795, 16 pages.
Yazdi, "Changing the Structure of Casein Micelles to Improve the Delivery of Bioactive Compounds. A Thesis presented to the University of Guelph" Guelph, Ontario, Canada, May 2012.

* cited by examiner

PREVENTING PHYSICAL INSTABILITY OF HEAT TREATED DAIRY BASED PRODUCTS

CROSS-REFERENCE TO RELATED APPLICATIONS

This application is a national phase application under 35 U.S.C. § 371 of PCT International Application No. PCT/EP2018/072795, filed Aug. 23, 2018, which claims the benefit of European Application No. 17187502.4, filed Aug. 23, 2017, each of which are herein incorporated by reference.

TECHNICAL FIELD

The present invention relates to preventing physical instability of heat treated dairy based products by addition of polyphenol compounds.

BACKGROUND

The shelf life of long life liquid dairy products, such as ultra-high temperature (UHT) milk, is limited by physical and chemical changes which make the consumer reject the product rather than microbial spoilage. Chemical changes include the Maillard reaction and oxidation, resulting in off flavour generation and colour changes. The most important physical changes are sedimentation or age gelation and creaming in fat containing products. Gelation and sedimentation change the perception and appearance of products resulting in gel clumps, increase or decrease in viscosity and an overall inhomogeneous product. Creaming leads to an unwanted fat layer or fat clumps in the product.

Age gelation has been used in a broad sense to describe physical instability in sterilized milk and other heat treated dairy products. Different causes for gelation and gel characteristics have been described in literature and can roughly be divided into proteolysis induced gelation, non-enzymatic gelation and a combination of both (Nieuwenhuijse, J. A., & van Boekel, M. A. J. S. (2003). Protein Stability in Sterilised Milk and Milk Products. In P. F. Fox & P. L. H. McSweeney (Eds.), Advanced Dairy Chemistry—1 Proteins (pp. 947-974): Springer US).

Protease induced age gelation has been mainly ascribed to heat resistant indigenous and microbial enzymes. The major indigenous protease plasmin can withstand certain UHT treatments and hydrolyses mainly β- and α-caseins. The released peptides and polypeptides can dissociate from the casein micelle and aggregate resulting in a fine stranded gel (Manji, B., & Kakuda, Y. (1988). The Role of Protein Denaturation, Extent of Proteolysis, and Storage Temperature on the Mechanism of Age Gelation in a Model System. Journal of Dairy Science, 71, 1455-1463). Limited proteolysis by plasmin can also lead to a destabilization of casein micelles resulting in a gelled sediment. Heat resistant microbial proteases often originate from psychrotrophic bacteria and vary greatly in specificity. For unspecific proteases, similar gels compared to plasmin can be formed, while some proteases mainly hydrolyse κ-casein resulting in a rennet like gel.

Gelation in products without proteolysis is dependent on the dry matter content of the product and storage temperature. Gelation time decreases with increasing dry matter content. At high storage temperatures above 35° C., gelation is thought to be caused by sedimentation followed by crosslinking of casein micelles resulting in a gelled sediment. At lower temperatures, casein micelles can slowly dissociate and individual proteins as well as protein particles aggregate and form a gel (Nieuwenhuijse & van Boekel, 2003).

The rate of creaming is dependent on the particle size of the fat globules and the difference in density of these particles and the surrounding serum phase. Aggregation of fat globules greatly enhances the creaming rate.

There is an increased demand for life of long life dairy products, and thus methods for providing such products. US 2012/058240 discloses physical stability of heat treated skim milk with fruit extracts (blueberry, pomegranate and cranberry) for stability. CN 103 181 414 discloses heat treated raw milk with flavonoids obtained from sea buckthorn, which is then fermented to a yogurt with several positive characteristics after 30 day of storage without refrigeration.

CN 103 503 998 relates to a milk tea, obtainable by dissolving a tea powder and adding a milk powder and UHT sterilizing, wherein a combination of thickener and emulsifier is added to improve stability. O'Connell et al. (International Dairy Journal, 1998, 8, 8, 689-693) discloses increased colloidal stability of heat treated skim milk with a freeze dried green tea extract. However, the disclosure of D4 relates to heat stability at differing pH and not physical stability upon long term storage (age gelation) after UHT sterilization.

However, there is still a need for improved methods for providing long life dairy products with high physical stability.

SUMMARY

In one aspect, the present invention concerns a method of preventing physical instability of a heat treated dairy based product by adding one or more polyphenol compounds.

In another aspect, the present invention concerns a method of producing a dairy based product suitable for long-term storage, said method comprising the steps of:
 a. providing a dairy based product;
 b. subjecting the dairy based product to heat treatment;
 c. homogenizing the dairy based product; and
 d. adding one or more polyphenol compounds to the dairy based product;
wherein step c) is optional; and steps b, c, and d may be performed in any order.

In a third aspect, the present invention concerns a heat treated dairy based product wherein one or more polyphenol compounds have been added.

DETAILED DESCRIPTION

Figure 1:
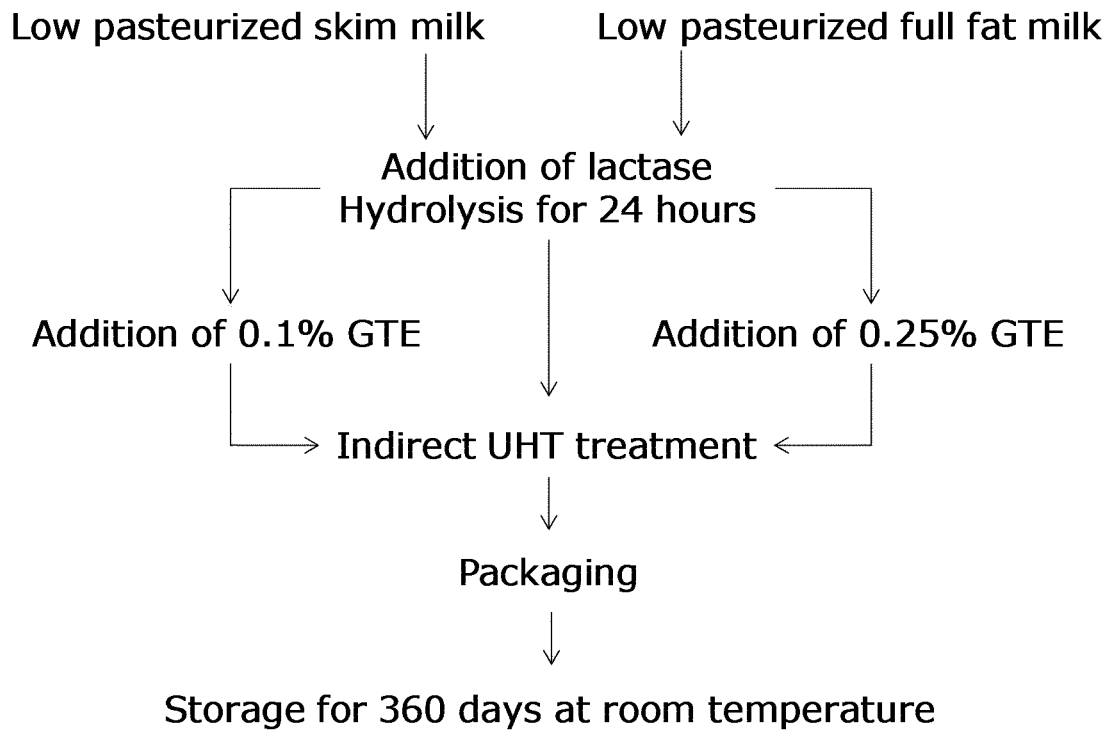
FIG. 1. Flow diagram showing the milk samples produced in the present study.

New methods of preventing physical instability in heat treated dairy based products are provided herein. Heat treated dairy based products are also provided, in which physical instability is prevented. Physical instability is generally seen after prolonged storage of dairy products, which have been subject to heat treatment, which is commonly used to provide safe and shelf-stable milk. Some physical instability, such as creaming and gelation, are associated with a change in texture and viscosity of the dairy product, and is particularly observed after at least 6 months storage or more.

The term "physical instability" refers to processes which change the texture, viscosity or appearance of a product. These may be related to fat and/or protein interactions or caused by gravitational forces. Processes within physical instability may be selected from the group consisting of sedimentation, gelation, gelled sediment, creaming, coalescence, aggregation, and flocculation. In a preferred embodiment, physical instability is gelation, creaming and/or gelled sediment creaming.

The term "gelation" refers to formation of a gel, which can occur upon storage of heat treated dairy based products, such as UHT milk. During storage, there is a sudden sharp increase in viscosity accompanied by visible gelation and irreversible aggregation. Gelation is also sometimes referred to as age gelation, since gelation normally arises after prolonged storage.

The term "creaming" and "sedimentation" refers to migration of the dispersed phase of an emulsion, under the influence of buoyancy. The particles float upwards or sink, depending on how large they are and how much less dense or more dense they are than the continuous phase, and also how viscous or how thixotropic the continuous phase is. Preferably, "creaming" refers to the process by which cream rises to the top of a heat treated dairy based product, such as UHT milk, whereas "sedimentation refers to the process by which mainly proteins aggregate and/or precipitate and subsequently sink to the bottom.

The term "gelled sediment" refers to a gel-like sediment caused by rearrangement of deposited protein and/or fat to a gel.

The term "coalescence" refers to a process wherein two or more separate particles merge into one.

The term "aggregation" refers to a process wherein particles of a colloidal system stick to each other and forms irregular particle clusters, flocs, or aggregates.

The term "flocculation" refers to a process of contact and adhesion whereby the particles of a dispersion form larger-size clusters, such as whereby colloids come out of suspension and form floc or flake. Flocculation may be reversible aggregation.

Method of Preventing Physical Instability

In one aspect, the current invention relates to a method of preventing physical instability of heat treated dairy based product. The present inventors have surprisingly found that addition of polyphenol compounds to dairy products, which have been subject to heat treatment are less prone to gelation and creaming upon prolonged storage of 6 months or more.

In one aspect, a method is therefore provided for preventing physical instability of a heat treated dairy based product, the method comprising adding one or more polyphenol compounds to the heat treated dairy product.

Further details with respect to dairy based products, heat treatment and polyphenol compounds are described herein below. Specifically preferred dairy products include lactose-hydrolyzed dairy products and ultra-high temperature (UHT) treated milk.

Most preferred polyphenol compounds include those present in green tea and extracts thereof.

The method of preventing physical instability of a heat treated dairy based product as provided herein may comprise one or more of the following steps, in any relevant order:
  a. Providing a dairy based product;
  b. Subjecting the dairy based product to heat treatment;
  c. Homogenizing the dairy based product; and
  d. Adding one or more polyphenol compounds to the dairy based product.

In particular, steps b), c), and d) may be performed in any order. Preferably, steps b), c) and d) are conducted in the above mentioned order. In one embodiment, step c) is conducted prior to step b). In one embodiment, the heat treatment is sterilization. In this embodiment, step c) is preferably conducted prior to step b). In one embodiment, step d) is conducted prior to heat treatment. In one embodiment, step c) is performed prior to step d).

Step c) is optional. Especially, step c) is optional for low fat products. In one embodiment, step c) is not included in said method. In one embodiment, step c) comprises a two-step homogenization, wherein the pressure of the first stage is between 100 and 250 bars; and the pressure of the second stage is between 0 and 60 bars. For yoghurts, step c) may comprise one homogenization step wherein the pressure is between 50 and 80 bars.

Method of Production

Given that the present inventors have found that addition of phenol compounds prevents gelation and creaming in dairy products, which have been subject to heat treatment for longer shelf life, a method is also provided herein for production of dairy based products, which are suitable for long-term storage. Thus, in one aspect, the current invention concerns a method of producing a dairy based product suitable for long-term storage, which method comprises the steps of:
  a. Providing a dairy based product;
  b. Subjecting the dairy based product to heat treatment;
  c. Homogenizing the dairy based product; and
  d. Adding one or more polyphenol compounds to the dairy based product;
wherein step c) is optional; and steps b, c, and d may be performed in any order.

Steps b), c), and d) may be performed in any order. Preferably, steps b), c) and d) are conducted in the above mentioned order. In one embodiment, step c) is conducted prior to step b). In one embodiment, the heat treatment is sterilization. In this embodiment, step c) is preferably conducted prior to step b). In one embodiment, Step d) is conducted prior to heat treatment.

Step c) is optional. Especially, step c) is optional for low fat products. In one embodiment, step c) comprises a two-step homogenization, wherein the pressure of the first stage is between 190 and 200 bars; and the pressure of the second stage is between 0 and 60 bars.

Heat Treatment

In one embodiment, said heat treatment is selected form the group consisting of ultra-high temperature (UHT) processing, retorting and sterilization.

For long life low pH products, heat treatment is preferably conducted at between 75° C. to 95° C. for between 15 s to 45 s.

Ultra-High Temperature (UHT) Treatment

The UHT treatment (or UHT processing) of dairy based products may be conducted by any useful method available to the skilled person. UHT treatment comprises heating of the dairy based product to an ultra high temperature, for instance a temperature of 130-180° C. The UHT treatment may be either direct-contact UHT treatment, such as steam infusion or steam injection, or indirect-contact UHT treatment, such as in plate and tube heat exchangers. In one embodiment, the UHT treatment is combined with removal of microorganisms by physical separation, for example by using bactofugation or microfiltration. In one embodiment, the UHT treatment is conducted according to the known VTIS-method.

In one embodiment, said UHT-processing comprises:
i. subjecting the dairy product to a pre-heat treatment step at 80° C. to 95° C. for 30 s to 240 s;
ii. heat treating the dairy based product at between 130° C. and 160° C. for between 0.1 s and 10 s;
iii. cooling the dairy based product to obtain the dairy based product;

wherein step i) is optional.

In one embodiment, the temperature in step i) is at least 80° C., such as at least 85° C., such as at least 90° C., such as at least 95° C. In one embodiment, temperature in step i) is no more than 95° C., such as no more than 90° C., such as no more than 85° C. Preferably, temperature in step iii) is between 80° C. and 95°.

In one embodiment, the time of step i) is at least 30 s, such as 45 s, such as at least 60 s, such as at least 90 s, such as at least 120 s, such as at least 150 s, such as at least 180 s, such as at least 210 s, such as at least 240 s. In one embodiment, the time of step i) is no more than 240 s, such as no more than 210 s, such as no more than 180 s, such as no more than 150 s, such as no more than 120 s, such as no more than 90 s, such as no more than 60 s, such as no more than 45 s. Preferably, the time in step i) is between 60 s and 180 s.

Preferably, temperature in step i) is between 80° C. and 95° C. and the time in step ii) is between 60 s and 180 s.

In one embodiment, temperature in step ii) is at least 130° C., such as at least 140° C., such as at least 150° C., such as at least 160° C. In one embodiment, temperature in step ii) is no more than 160° C., such as no more than 150° C., such as no more than 140° C. Preferably, temperature in step ii) is between 136° C. and 150°.

In one embodiment, the time of step ii) is at least 0.1 s, such as 1 s, such as at least 2 s, such as at least 3 s, such as at least 4 s, such as at least 5 s, such as at least 6 s, such as at least 7 s, such as at least 8 s, such as at least 9 s, such as at least 10 s. In one embodiment, the time of step ii) is no more than 10 s, such as no more than 9 s, such as no more than 8 s, such as no more than 7 s, such as no more than 6 s, such as no more than 5 s, such as no more than 4 s, such as no more than 3 s, such as no more than 2 s, such as no more than 1 s. Preferably, the time in step ii) is between 4 s and 10 s.

Preferably, temperature in step ii) is between 136° C. and 150° C. and the time in step ii) is between 4 s and 10 s.

Sterilization

In one embodiment, said heat treatment is sterilization, wherein the dairy based product is heated to at least 120° C. for at least 15 min. Preferably, the dairy base product is heated to at least 120° C., such as at least to 125° C., such as at least 130° C., such as at least 140° C., such as at least 150° C. In one embodiment, the dairy based product is heated to no more than 150° C., such as no more than 140° C. In one embodiment, the dairy based product is heated to between 121° C. and 132° C. In another embodiment, the dairy based product is heated to between 134° C. and 138° C. Preferably, the dairy based product is heated for at least 15 minutes, such as at least 20 minutes, such as at least 30 minutes, such as at least 40 minutes, such as at least 50 minutes, such as at least 60 minutes, such as at least 90 minutes. In one embodiment, the dairy based product is heated for no more than 90 minutes, such as no more than 60 minutes, such as no more than 50 minutes, such as no more than 40 minutes, such as no more than 30 minutes, such as no more than 20 minutes.

In one embodiment, the dairy based product is heated to at least 121° C. for 15 to 30 minutes.

In one embodiment, the dairy based product is heated to between 121° C. and 132° C. for 60 minutes.

In one embodiment, the dairy based product is heated to between 134° C. and 138° C. for 18 minutes.

Heat Treated Dairy Based Product

In one aspect, the current invention concerns a heat treated dairy based product wherein one or more polyphenol compounds have been added. The heat treatment is described above. Preferably, said heat treated dairy based product is UHT-processed.

The concentration of the one or more polyphenol compounds in the heat treated dairy based product is between 0.01 wt % to 0.25 wt %, such as between 0.05 wt % to 0.20 wt %, such as 0.08 wt % to 0.15 wt %, such as 0.1 wt %.

In a preferred embodiment, said dairy based product is lactose hydrolyzed.

In one embodiment, the heat treated dairy based product has a shelf life of at least 6 months, such as at least 12 months, such as at least 18 months, such as at least 24 months, such as at least 30 months, such as at least 36 months without significant physical instability.

In one embodiment, the heat treated dairy based product has been stored for at least 6 months after addition of the one or more polyphenol compounds, such as at least 12 months, such as at least 18 months, such as at least 24 months, such as at least 30 months, such as at least 36 months after addition of the one or more polyphenol compounds.

Said heat treated dairy product may be prepared by a method described herein. In addition, the invention also relates to a heat treated dairy product obtainable or obtained by any of the methods described herein, in particular the disclosed methods of producing a dairy based product suitable for long-term storage, said method comprising:
a. providing a dairy based product;
b. subjecting the dairy based product to heat treatment;
c. homogenizing the dairy based product; and
d. adding one or more polyphenol compounds to the dairy based product;

wherein step c) is optional; and steps b, c, and d may be performed in any order.

Dairy Based Products

The current inventions relates to dairy based products. In one embodiment, the dairy based product is a liquid dairy based product. In another embodiment, the dairy based product is a beverage. In one embodiment, the dairy based product is selected from the group consisting of whole fresh milk, milk cream, reduced-fat milk, low-fat milk, semi skimmed milk, skimmed milk/non-fat milk, organic milk, heat treated milk, raw unfiltered milk, homogenized milk, filtered milk, recombined dairy based products, chemically acidified dairy based products and fermented dairy based products.

The term "reduced-fat milk" refers to milk with 2% fat, and the term "low-fat milk" refers to milk with 1% fat.

The term "heat treated milk" includes pasteurized milk, sterilized milk, UHT milk, evaporated milk and condensed milk.

In one embodiment, the dairy based product is a milk product. In another embodiment, the dairy based product is a milk product. In another embodiment, the dairy based product is a drinkable yogurt or a heat treated fermented product. In one embodiment, the dairy product is a fermented drinkable dairy beverage.

In one embodiment, pH of the dairy based product is neutral. In one embodiment, pH of the dairy based product is in the range of 6.0 to 7.5, preferably in the range of 6.6 to 7.0. In another embodiment, pH of the dairy product is in the range of 4.0 to 5.0, preferably in the range of 4.2 to 4.6.

Dairy Based Products Comprising Additives

The dairy based product may comprise one or more additives. For example, the one or more additive is a flavor. Common flavors include e.g. vanilla, chocolate, strawberry, banana, blueberry, mango, pineapple, date, blackcurrant, raspberry, lemon, orange.

Alternatively, or in addition, the additive is a fruit preparation. The fruit preparation can be made from strawberry, banana, blueberry, mango, pineapple, date, blackcurrant, raspberry, lemon or orange.

Alternatively, or in addition, the additive is a vitamin. Particular useful vitamins are vitamin A, vitamin C and vitamin D.

Alternatively, or in addition, the additive is a mineral or metal. Useful minerals are for example the mineral supplement Capolac MM-0525. Useful metals are iron or zinc in the form of e.g. Ferric Ammonium Citrate, Ferrous Lactate, Ferrous Sulfate, Ferric Pyrophosphate, zinc sulfate, Zinc oxide or Zinc gluconate.

Another useful additive is whey protein, skim milk powder or whole milk powder.

Alternatively, or in addition, the additive is a stabilizer. Useful stabilizers are carrageenan, pectin, agar, starch, physically or chemically modified starch, locust bean gum, guar gum, gellangum, xhantan gum, gelatin, cellulose or carboxymethyl cellulose.

Alternatively, or in addition, the additive is a sugar or sweeteners. Useful sugars and sweeteners are sucrose, fructose, lactose, steviol glycoside, aspartame, acesulfame potassium, sucralose, mon fruit, honey.

Other useful additives are oligosaccharides and fibers. Useful oligosaccharides are fructooligosacharides and galactooligosacharides. Useful fibers are inulin, oat meal or oat meal flour.

Other useful additives are stabilizing salts. Useful stabilizing salts are disodium phosphate, trisodium phosphate, polyphosphate, calciumchloride or sodium citrate.

Yet other useful additives are emulsifiers. Useful emulsifiers are mono- and diglycerides of fatty acids.

Alternatively, or in addition, the additive is a color. Useful colors include carmine red, beta carotene, annato, carmine blue.

Lactose Hydrolyzed Dairy Based Products

In some embodiments, the dairy based product is a lactose hydrolyzed dairy based product. The term "lactose hydrolysis" refers to a process wherein lactose is degraded, e.g. into galactose and glucose. In one embodiment, the lactose hydrolysis is conducted by use of one or more enzymes. Preferably, said enzyme is a lactase, such as Maxilact LAGX (DSM) or Opti-Lactase LX2 (Optiferm). The term "lactose hydrolysed" products as used herein refers to products that wherein the lactose is partially or fully hydrolyzed. For example, the product which has been lactose hydrolyzed contains no more than 0.5% of lactose, such as no more than 0.1%, such as less than 0.01% of lactose. Preferably, a product which has been lactose hydrolyzed contains no lactose. In one embodiment, at least 50% of the lactose has been hydrolyzed, such as at least 60%, such as at least 70%, such as at least 80%, such as at least 90%, such as at least 95%, such as at least 98% of the lactose has been hydrolyzed. Preferably, 100% of the lactose has been hydrolyzed.

The lactose hydrolysis may be conducted at any stage of the methods described herein. Preferably, the lactose hydrolysis is conducted after subjecting the dairy based product to heat treatment; to homogenizing the dairy based product; and to the addition of the one or more polyphenol compounds to the dairy based product.

The lactose hydrolysis may be conducted by any useful method available to the skilled person. For example, the lactose hydrolysis is conducted as described in Example 1.

Polyphenol Compounds

In the present invention, one or more polyphenol compounds are added to heat treated dairy based products.

The term "polyphenol" refers to polyhydroxy phenols or molecules comprising more than one phenol structural unit. Said phenol structural unit may be a polyhydroxy phenol structural unit.

The term "phenol" as used herein refers to molecules having one or more hydroxy groups attached to a benzene or other arene ring.

The term "polyhydroxy phenol" refers to phenol derivatives wherein more than one of the hydrogens of the benzene moiety is substituted by a hydroxyl group.

In one embodiment, the polyphenol compound is an antioxidant.

In one embodiment, the one or more polyphenol compound is selected from the group consisting of polyphenols are flavonoids, phenolic acids, stilbenoids, tannins, and lignans.

Flavonoids have the general structure of a 15-carbon skeleton, which comprises two phenyl rings and heterocyclic ring. Examples of flavonoids are flavanols (such as catechins, epicatechins, flavone-derived tannins, gallocatechin, epigallocatechin, epigallocatechin gallate, theaflavin, procyanidin, prodelphinidin, and cinnamtannin), flavonols (such as kaempferol, quercetin, galangin, 5,7-hydroxy-flavonol, myricetin, 3-hydroxyflavone, azaleatin, fisetin, gossypetin, kaempferide, isorhamnetin, morin, natsudaidain, pachypodol, rhamnazin, and rhamnetin), flavones (such as apigenin, chrysin, tectochrysin, genkwanin, ombuin, pinocembrin, tangeritin, luteolin, 6-hydroxyflavone, baicalein, scutellarein, wogonin, diosmin, flavoxate, 7,8-dihydroxyflavone, isorhoifolin, neodiosmin, rhoifolin, sinensetin, nobiletin, tangeretin, geraldone, hispidulin, cirsimaritin, pebrellin, garbenin B, nepetin, jaceosidin, cirsilineol, eupatorin, hydroxyleutin, and chrysoeriol), isoflavones (such as daidzein, glycitein, formononetin, genistein, biochanin A, angolensin, calycosin, equol, orobol, prunetin, pseudobaptigenin, puerarin, irisolidone, tectoridin, isotectorigenin, irilone, vestitone, sativanone, butin, melanettin, stevenin, biolanone, and isoliquiritigenin), flavanones (such as naringenin, butin, eriodicytol, sakuranetin, scoparone, hesperetin, eriocitrin, hesperidin, naringin, narirutin, neoeriocirtin, neohesperidin, poncirin, didymin, isosakuranetin, pinocembrin, prenylnaringenin, geranylnaringenin, isoxanthohumol, and homoeriodictyol), chalcones (such as butein, xanthohumol, and phloretin), and anthocyanidins (such as pelargonidin, cyanidin, delphinidin, petunidin, peondin, malvidin, visitin A, and pinotin A).

In one embodiment, the flavonoids are selected from the group consisting of flavanols, flavonols, flavones, isoflavones, flavanones, anthocyanins, and chalcones. In one embodiment, the flavanols are selected from the group consisting of catechins, epicatechins, flavone-derived tannins, gallocatechin, epigallocatechin, epigallocatechin gallate, theaflavin, procyanidin, prodelphinidin, and cinnamtannin. Preferably, the polyphenol compound is epigallocatechin or epigallocatechin gallate.

Phenolic acids, or phenolcarboxylic acids, comprises a phenolic ring and an organic carboxylic acid function. Examples of phenolic acids are hydroxybenzoic acids (such as gallic acid, vanillic acid, protocatechoic acid, syringic acid, salicyclic acid, ellagic acid, gallagic acid, gentisic acid, hippuric acid, lambertianin C, paenoniflorin, protocatechuic acid, punicalagin, punicalin, and sanguiiin H-6), hydroxycinnamic acids (such as caffeic acid, cichoric acid, cinnamic acid, diferulic acid, sinapinic acid, coumaric acid, ferulic acid, curcumin, chlorogenic acid, rosmarinic acid, schottenol ferulate, sinapic acid, sinapine, and verbascoside), hydroxyphenyl acetic acids, hydroxyphenylpropoanoic acids, and hydroxyphenylpentanoic acids.

Stilbenoids are hydroxylated derivatives of stilbenes. Examples of stilbenoids are resveratrol, viniferin, piceid, pallidiol, picetannol, oinosylvin, and pterostilbene.

Examples of tannins are tannic acid and phlorotannins.

Examples of lignans are pinoresinol, arctigenin, conidendrin, cycloariciresinol, deoxyschisandrin, enterodiol, enterolactone, episesamin, episesaminol, gomisin, isohydroxymataresinol, isolariciresinol, lariciresinol, matiresinol, medioresinol, nortrachelogenin, schisandrin, schisanhenol, schisantherin, secoisolariciresinol, sesamin, sesaminol, sesamol, sesamolinol, syringaresinol, tigloylgomicin H, todolactol A, and trachelogenin.

Other examples of polyphenol compounds are alkylmethoxyphenols, alkylphenols, curcuminoids, furanocoumarins, hydroxybenzaldehydes, hydroxybenzoketones, hydroxycinnamaldehydes, hydroxycoumarins, hydroxyphenylpropenes, methoxyphenols, naphthoquinones, phenolic terpenes, and tyrosols.

Examples of phenolic tarpenes are carnosic acids, carnosol, carvacrol, epirosmanol, rosmadial, rosmanol, and thymol.

In some embodiments, said polyphenol compound is in form of a gallate, i.e. an ester of the phenol compound and gallic acid (3,4,5-trihydroxybenzoic acid). Preferably, the phenolic compound is epigallocatechin-3-gallate (EGCG).

In some embodiments, the polyphenol compound is a phenolic glycoside, i.e. a sugar with a glycosidic bond to an aglycone, which is a polyphenol or polyhydroxy phenol structure. Examples of phenolic glycosides are agnuside, arbutin, astrigin, curculigoside A, daphnin, diptoindonesin A, fraxin, helicon, isorhapontin, gastrodin, koaburaside, nothofagin, oleuropein, p-coumaric acid glucoside, phillyrin, phlorizin, picein, populin, pungenin, resveratroloside, rhaponticin, scopolin, secoisolariciresinol diglucoside, tangshenoside I, salicortin, poliothrysiside, salidroside, salireposide, tremulacin, gandidentatin, picein, triandrin, trichocarposide, vimalim, trichocrpin, isosalipurposide, isograndidentatin, chaenomeloidin, populoside A, B, C, fragilin and salicin.

Polyphenol compound also includes variants of polyphenol compounds, such as compounds being modified, such as being acetylated, alkylated, glycosylated, coupled to amino acids such as tyrosine and/or polymerized polyphenol compound. For example, polyphenol compound include oligomeric flavonoids such as proanthocyanidin.

Amount of Polyphenol Compound

In one embodiment, the concentration of the one or more polyphenol compounds after adding to the dairy based product is between 0.01 wt % to 0.25 wt %, such as between 0.05 wt % to 0.20 wt %, such as 0.08 wt % to 0.15 wt %, such as 0.1 wt %.

In one embodiment, the concentration of the one or more polyphenol compound after adding to the dairy based product is no more than 0.25 wt %, such as no more than 0.20 wt %, such as no more than 0.15 wt %, such as no more than 0.10 wt %, such as no more than 0.05 wt %.

In one embodiment, the concentration of the one or more polyphenol compound after adding to the dairy based product is at least 0.01 wt %, such as at least 0.05 wt %, such as at least 0.15 wt %, such as at least 0.20 wt %.

Extracts

In one embodiment, the one or more polyphenol compounds is an extract selected from the group consisting of extracts from fruits, vegetables, whole grains, tea, herbs, spices, nuts, seeds, cocoa chocolate and wine. Preferably, said extract is a green tea extract, a grape seed extract or a rosemary extract. In a preferred embodiment, said extract is a green tea extract.

In one embodiment, said extract is selected from the group consisting of Teavigo® Green tea extract, Activin™ Grape seed extract, and Guardian™ Rosemary extract.

In one embodiment, said one or more polyphenol compound constitute at least 50 wt % of the extract, such as at least 60% w/w, such as at least 70% w/w, such as at least 75% w/w, such as at least 80% w/w, such as at least 85% w/w, such as at least 90% w/w, such as at least 95% w/w, such as at least 98% w/w, such as at least 99% w/w, such as 100% w/w of the extract. In one embodiment, said one or more polyphenol compound constitute no more than 98 wt % of the extract, such as more than 95 wt %, such as no more than 90 wt %, such as no more than 85 wt %, such as no more than 80 wt %, such as no more than 75 wt %, such as no more than 70 wt %, such as no more than 60 wt %, such as no more than 50 wt % of the extract. Preferably, said extract is a green tea extract.

In another embodiment, said one or more polyphenol compound constitute at no more than 15 wt % of the extract, such as no more than 10 wt %, such as no more than 5 wt %, such as no more than 2 wt % of the extract. In yet another embodiment, said one or more polyphenol compound constitute at least 2 wt % of the extract, such as at least 5 wt %, such as at least 10 wt %, such as at least 15 wt % of the extract. Preferably, said extract is a rosemary extract.

In one embodiment, the concentration of the extract after adding to the dairy based product is between 0.01 and 0.4 wt %, such as between 0.05 and 0.3 wt %, such as between 0.1 and 0.3 wt %.

In one embodiment, the concentration of the extract after adding to the dairy based product is at least 0.01 wt %, such as at least 0.05 wt %, such as at least 0.1 wt %, such as at least 0.15 wt %, such as at least 0.2 wt %, such as at least 0.25 wt %, such as at least 0.3 wt %.

In one embodiment, the concentration of the extract after adding to the dairy based product is no more than 0.5 wt %, such as no more than 0.4 wt %, such as no more than 0.35 wt %, such as no more than 0.3 wt %, such as no more than 0.25 wt %.

EXAMPLES

Example 1—Production and Storage of Lactose Reduced UHT Milk Drinks with Green Tea Extract Preparation of lactose reduced UHT samples was performed at Arla Foods dairy plant (Pronsfeld, Germany). Pasteurized skim milk (0.1% fat) and full fat milk (3.5% fat) was used for the trials. Lactase (Opti-Lactase LX2, Optiferm, Germany) was added to the milk to a final concentration of 0.1%. Lactose was hydrolysed over night at 8° C. The milk was subsequently preheated at 95° C. for 120 s followed by UHT treatment using a tubular heat exchanger for 4 s at 141° C., cooled to 20° C., and aseptically filled in 320 mL bricks. GTE was added to the milk before UHT treatment to a final concentration of either 0.1% (w/v) (GTE-low) or 0.25% (w/v) (GTE-high) using a high shear mixer. Control sample without addition of GTE was included in the experimental design, see FIG. 1. Two independent batches of each milk sample (control, GTE-low, and GTE-high for both skim and full fat milk) were prepared resulting in a total of six samples produced in two independent replicates. In addition, two control batches and two batches of 0.1% GTE were produced with degassing of the milk prior to filling. These batches were produced in order to test if a degassing step would limit oxidation. Carbohydrate profile was analyzed by the method described by Indyk et al. (H. E. Indyk, M. J. Edwards, D. C. Woollard, "High performance liquid chromatography analysis of lactose hydrolyzed milk", Food Chemistry, Vol. 57, No. 4, pp. 575-580, 1996.), and showed that 65% lactose was hydrolyzed in all milk samples.

The milk samples prepared in Example 1 were stored at room temperature (22° C.) in darkness for one year and the temperature was monitored by a temperature logger.

Chemicals and Reagents

Teavigo® green tea extract (GTE) was obtained from Taiyo International (Minneapolis, USA), and was reported to contain 95.3% EGCG based on chromatographic analysis.

Sensory Descriptive Analysis

The analyses and results of skim and full fat milk were treated separately. A sensory descriptive analysis of skim milk and full fat milk was conducted by a trained panel (n=10/11) after 0, 4, 8 and 12 months of storage to study the sensory variation due to storage time. The panellists were selected from the external sensory panel of Department of Food Science at University of Copenhagen-SCIENCE, Denmark, according to the selection criteria of ISO 3972 (1991) and they were previously trained in performing descriptive analyses of food products. The same panellists were attempted to be maintained throughout the entire storage period but only 4 of the panellists took part in all the sensory evaluations. The same preparation procedure for the sensory evaluation was performed for each storage time. Each milk variant was poured in 50 ml portions in 96 ml transparent, non-coloured, odourless polystyrene cups with a lid (Solo Cup Company, USA), and the samples were brought to room temperature (21° C.) to ensure that the panellists were able to detect the taste nuances in milk. Each sample was blinded with three-digit random numbers. Each sensory descriptive analysis consisted of 4 days of training (2 h/day) followed by 3 days of sensory profiling (2 h/day). During the first training sessions (profiling by month 0), a sensory vocabulary to describe the variation between the milk was generated by panel consensus. Sensory descriptors describing well-known storage off-flavours in milk, such as cardboard flavour, were included in the vocabulary even though these were not relevant for describing the milk at month 0. This was performed in order to develop a vocabulary to be used through the entire storage period. The vocabulary development was supported by reference materials to increase the panellists' cognitive clarity towards the descriptors. The final sensory vocabulary included 27 descriptors, including 4 appearance descriptors, 2 taste descriptors, 12 flavour descriptors, 2 mouth feeling descriptors, 4 aftertaste descriptors and 3 descriptors for overall evaluation (see Table 1) and this vocabulary was used to determine the sensory profile of the milk variants at 0, 4 and 8 months of storage. After 12 months of storage, it was decided not to taste the milk due to the sensory characteristics the milk had developed. Thus, the vocabulary was reduced to 5 appearance descriptors, 13 odour descriptors (developed from the flavour/aftertaste descriptors used during the 0, 4 and 8 months profiling) and 1 texture descriptor (see Table 1).

TABLE 1

Sensory descriptors used for skim milk and full fat milk at 0, 4 and 8 months of storage and at 12 months of storage. Suffix to the sensory descriptors indicates the type of assessment by panellists: -A: Appearance, -T: Taste, -F: Flavor, -MF: Mouthfeel, -AT: Aftertaste, -TX: Texture, O: Odor.

| Descriptor type | Descriptors used for milk samples stored for 0, 4, and 8 months | Descriptors used for milk samples stored for 12 months |
|---|---|---|
| Appearance | Brown-A | Brown-A |
| | Pink-A | Pink-A |
| | Oily-A | Oily-A |
| | Gel-A | Gel-A |
| | | Pieces on surface-A |
| Texture | | Viscous-TX |
| Taste | Sweet-T | |
| | Bitter-T | |
| Flavor/Odor | Cream-F | Cream-O |
| | Corn-F | Corn-O |
| | Strawberry-F | Strawberry-O |
| | Boiled milk-F | Boiled milk-O |
| | Caramel-F | Caramel-O |
| | Fermented-F | Fermented-O |
| | Mushroom-F | Mushroom-O |
| | Hay/cereal-F | Hay/cereal-O |
| | Rancid-F | Rancid-O |
| | Cardboard-F | Cardboard-O |
| | Metallic-F | Metallic-O |
| | Sulphur-F | Sulphur-O |
| | | Stable-O |
| Mouthfeel | Viscous-MF | |
| | Coating-MF | |
| Aftertaste | Metallic-AT | |
| | Bitter-AT | |
| | Astringent-AT | |
| | Stable-AT | |
| General | Fresh | |
| | Harmonious | |
| | Flat | |

The sensory descriptive analysis was conducted in test booths designed according to the ISO standard 8589 (2007). During the sensory descriptive analysis, the panel simultaneously evaluated the milk in triplicates over three sessions. For each session, the panel first evaluated the skim milk and next the full fat milk. The presentation order was monadic and randomised within milk type to reduce bias related to presentation order. The intensities of the descriptors were rated on a 15 cm-line scale anchored "none" to "a lot". The panel was provided with crackers, cold and lukewarm water to rinse their mouth after each milk evaluation. Data was collected using the Fizz Acquisition, Version 2.00, Biosystemes.

Data Analysis

As two batches of each milk variant were produced, it was tested whether these were perceived similar from a sensory perspective. The effect of batches was calculated on each storage time by one way ANOVA with batch as fixed factor with following multiple comparisons of means by Tukey's HSD tests using the statistical software package R version 2.15.2 (R Development Core Team 2012). As the batches overall were perceived similar throughout storage time of 12 months for both skim milk and full fat milk, the data is presented as average of the two batches.

The effect of GTE concentration and storage time on the sensory profile of the milk was studied for the appearance descriptors up to 12 months of storage and for the taste, flavour, mouth feeling, aftertaste and overall evaluation descriptors up to 8 months of storage by mixed model ANOVA in R v3.2.2 (R Development Core Team 2012) using the lmerTest package. The interaction of GTE concentration and storage time was studied for each sensory descriptor. Batches were included in the model as random factor. The panellists were not included as random effect as they varied from profiling to profiling at the different storage time. The analyses were followed by post hoc test ($P<0.05$) for multiple comparisons. With respect to the odour and texture descriptors developed to study the sensory profile after 12 months, the effect of GTE concentration was analysed using one way ANOVA with GTE concentration as fixed factor and batch random factor followed by multiple comparisons of means by Tukey's HSD tests using the statistical software package R version 2.15.2 (R Development Core Team 2012).

Example 2—Effect of Green Tea Extract on Gelation in UHT Milk

Gelation was evaluated in all milk types prepared in Example 1 throughout the 12-months storage period.

Sensory Descriptive Analysis

Figure 2:
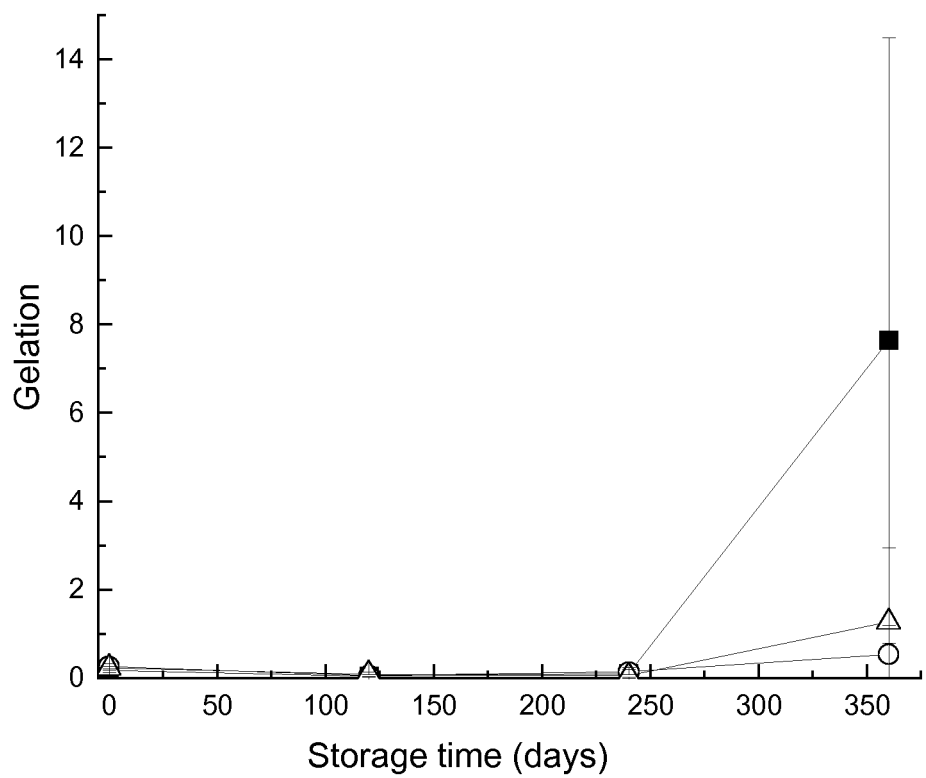
FIG. 2. Sensory assessed gelation (appearance descriptor) in lactose reduced UHT milk without green tea extract (GTE) added (control; squared symbols), 0.1% GTE added (circular symbols), or 0.25% GTE added (triangular symbols) before UHT treatment and stored for up to 360 days at 22° C. Mean values from two independent batches of UHT treatments are presented with standard deviation shown as error bars.

Gelation was evaluated by the sensory appearance descriptor "gel" in the Sensory descriptive analysis described in Example 2. No gelation was observed between 0 and 8 months of storage in all milk types. Between 8 and 12 months of storage gelation increased significantly in control skim milk, while no effect was observed in full fat milk (FIG. 2). The high standard deviation observed for gelation in the control skim milk is due to significant differences between the two independent batches ($p<0.001$). Surprisingly, no gelation was observed in skim milk added GTE at both doses used in the present example.

Sediment Analysis

Figure 3:
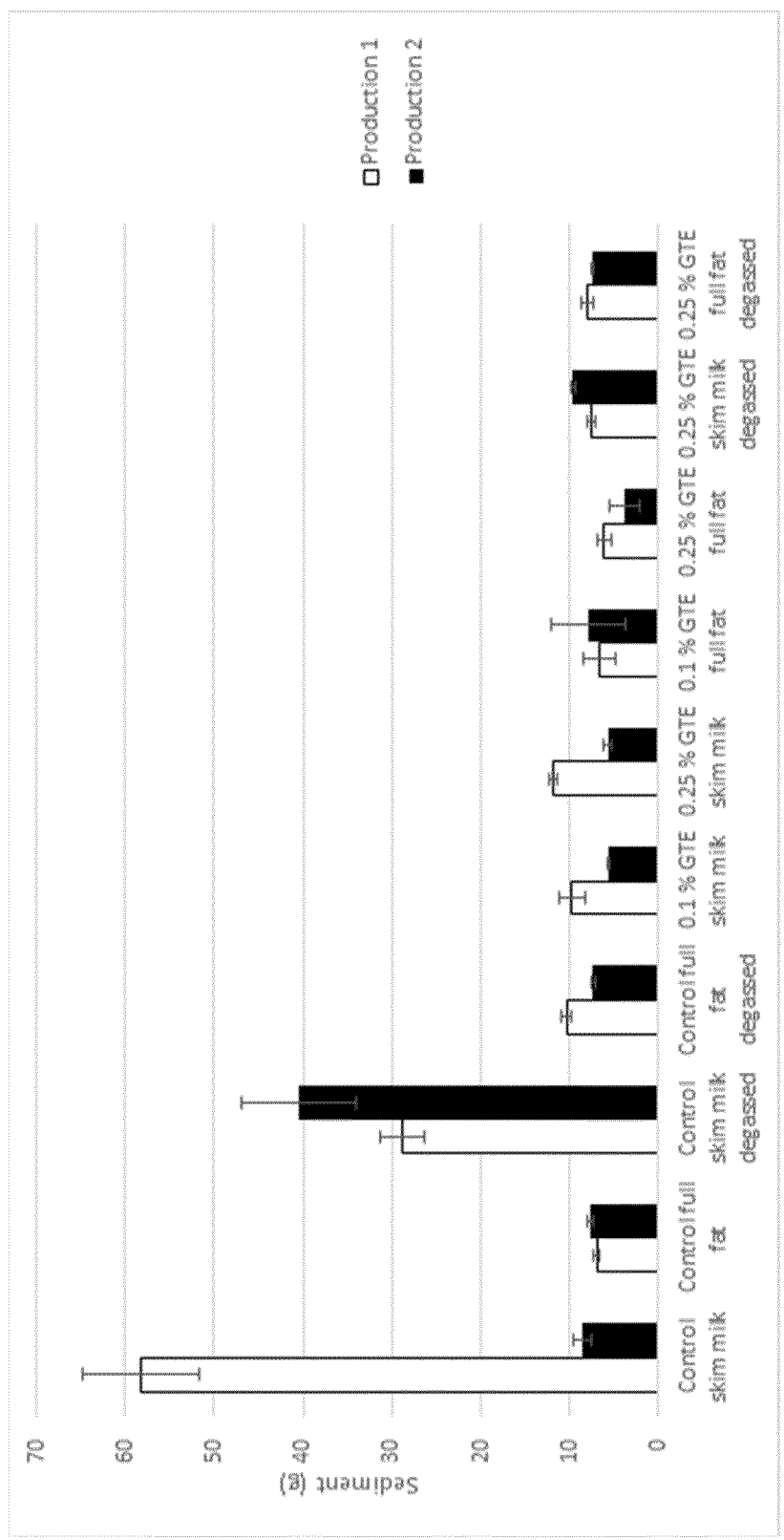
FIG. 3. Sedimentation in weight (g) in two independent batches (black and white bars) of UHT treated milk with and without added green tea extract (GTE) as determined after storage at 22° C. for 360 days. For each batch, five individual packs of each milk were analyzed and standard deviation is shown as error bars.

After 12 months of storage, gelation was clearly occurring in some of the milks. Sedimentation was determined by weight before and after the liquid was drained from the pack. Five individual packs of each milk were analyzed. Sedimentation based on weight was evaluated after 12 months of storage as presented in FIG. 3. These data shows similar effects as the sensory evaluation. No sedimentation was observed in full fat milk, while a pronounced sedimentation in control skim milk was found, although the variation between batches was relatively high. No significant sedimentation was observed in skim milk added GTE at both doses used. These data shows that addition of GTE, even at the low dose, inhibits age-gelation in skim milk during storage.

Creaming Analysis

Figure 4:
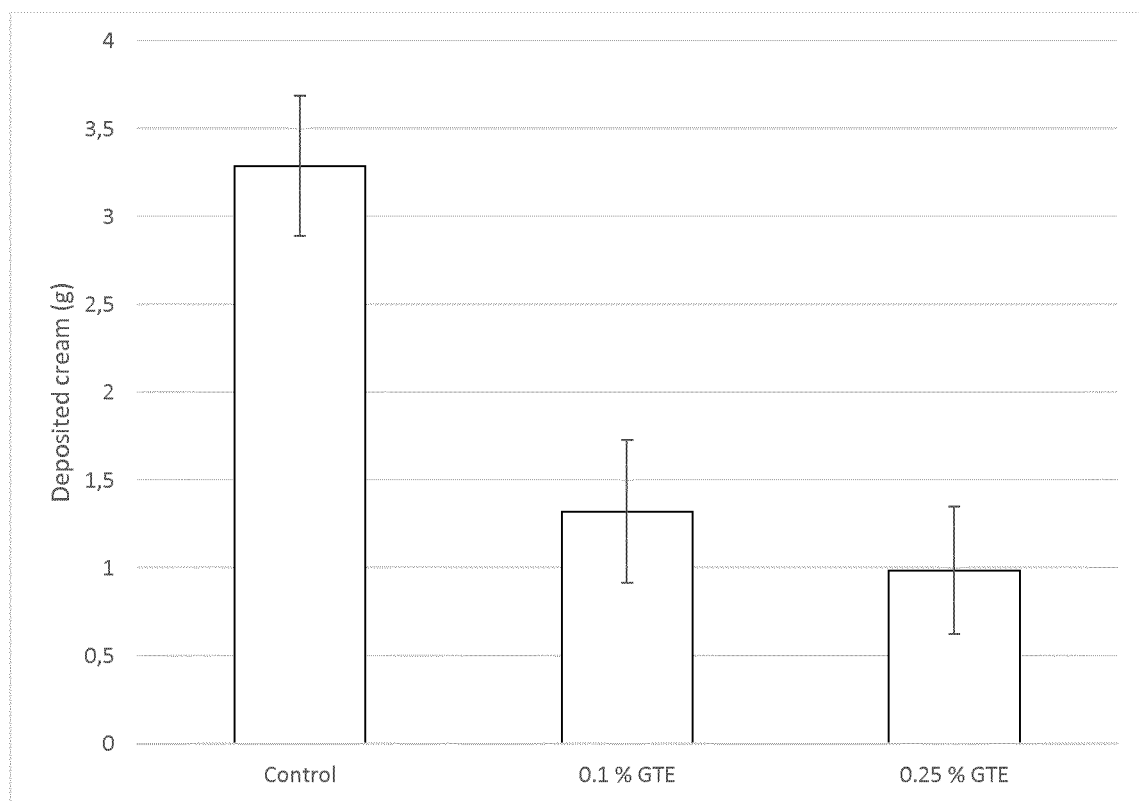
FIG. 4. Cream deposited on top of the carton in weight (g) in full fat milk as determined after storage at 22° C. for 360 days. Mean values from two independent batches (control, 0.1% GTE and 0.25% GTE) of UHT treatments are presented with standard deviation shown as error bars. For each batch, five individual packs of each milk were analyzed.

Creaming was initially observed after 6 months of storage as fine cream layer on top of the milk in the carton. After 9 and especially 12 months, a thick cream layer was observed on top of the milk and as deposit on the top of the carton. Creaming can be assessed by measurement of the fat content in different layers of the carton (Lu et al., 2013, International Journal of Dairy Technology, 66, 3, 325-332). This was not possible for this UHT milk since no homogenous sample could be taken. Instead, the deposited cream was carefully scraped off and weighed. Five individual packs of each milk were analyzed. Creaming based on weight of total cream was evaluated after 13 months of storage as presented in FIG. 4. The amount of deposited cream was reduced by 60 and 70% in milk with 0.1 and 0.25 added GTE respectively. The data shows that even low doses of added GTE greatly reduced creaming during storage.

Items

The following items 1-53 constitute preferred, however non-limiting, embodiments of the present invention.

1. A method of preventing physical instability of a heat treated dairy based product, said method comprising adding one or more polyphenol compounds to said heat treated dairy product.

2. The method according to item 1, wherein physical instability is selected from the group consisting of gelation, creaming, sedimentation, gelled sediment, coalescence, aggregation, and flocculation.

3. The method according to item 1, wherein the physical instability is gelation, creaming and/or gelled sediment creaming.

4. A method of producing a dairy based product suitable for long-term storage, said method comprising:
a. providing a dairy based product;
b. subjecting the dairy based product to heat treatment;
c. homogenizing the dairy based product; and
d. adding one or more polyphenol compounds to the dairy based product;
wherein step c) is optional; and steps b, c, and d may be performed in any order.

5. The method according to item 4, wherein step c. is performed prior to step d.

6. The method according to any one of the preceding items, wherein the heat treatment is selected from the group consisting of ultra-high temperature (UHT) processing, retorting and sterilization.

7. The method according to any one of items 4 to 6, wherein heat treatment is UHT-processing, said UHT-processing comprising:
i. subject the dairy product to a pre-heat treatment step at 80° C. to 95° C. for 30 s to 240 s;
ii. heat treating the dairy based product at between 130 and 160° C. for between 0.1 s and 10 s;
iii. cooling the dairy based product to obtain the dairy based product;
wherein step i) is optional.

8. The method according to item 7, wherein the temperature in step ii) is between 136° C. and 150° C.

9. The method according to item 7, wherein the time in step ii) is between 4 s and 10 s.

10. The method according to item 4, wherein said homogenization in step c) is a two-step homogenization.

11. The method according to item 10, wherein the pressure of the first stage is between 190 and 200 bars; and the pressure of the second stage is between 0 and 60 bars.

12. The method according to any one of items 4 to 6, wherein heat treatment is sterilization, said sterilization comprising heat treating the dairy based product at least 120° C. for at least 15 minutes.

13. The method according to item 12, wherein step c) of item 2 is conducted prior to step b) of item 4.

14. The method according to any one of the preceding items, wherein the dairy based product is selected from the group consisting of whole fresh milk, milk cream, reduced-fat milk (2%), low-fat milk (1%), semi skimmed milk, skimmed milk/non-fat milk, organic milk, heat treated milk (e.g. pasteurized milk, sterilized milk, UHT milk, evaporated milk, condensed milk), raw unfiltered milk, homogenized milk, filtered milk, recombined dairy based products, chemically acidified dairy based products and fermented dairy based products.

15. The method according to any one of the preceding items, wherein the dairy based product is a liquid dairy based product.

16. The method according to any one of the preceding items, wherein the dairy based product is a beverage.

17. The method according to any one of the preceding items, wherein the dairy based product is a milk product.

18. The method according to any one of the preceding items, wherein the dairy based product is a drinkable yogurt.

19. The method according to any one of the preceding items, wherein the dairy based product is a fermented drinkable dairy beverage.

20. The method according to any one of the preceding items, wherein pH of the dairy based product is neutral.

21. The method according to item 20, wherein pH of the dairy based product is in the range of 6.0 to 7.5, such as 6.6 to 7.0.

22. The method according to item 19, wherein pH of the dairy based product is in the range of 4.0 to 5.0, such as 4.2 to 4.6.

23. The method according to any one of the preceding items, wherein the dairy based product is a lactose hydrolyzed dairy based product.

24. The method according to any one of the preceding items, wherein the one or more polyphenol compounds is an antioxidant.

25. The method according to any one of the preceding items, wherein the one or more polyphenol compounds is selected from the group consisting of flavonoids, phenolic acids, stilbenes, tannins and lignans.

26. The method according to item 25, wherein the flavonoids are selected from the group consisting of flavanols, flavonols, flavones, isoflavones, flavanones, anthocyanins, and chalcones.

27. The method according to item 26, wherein the flavanols are selected from the group consisting of catechins, epicatechins, flavone-derived tannins, gallocatechin, epigallocatechin, epigallocatechin gallate, theaflavin, procyanidin, prodelphinidin, and cinnamtannin.

28. The method according to item 27, wherein the catechin is epigallocatechin-3-gallate (EGCG).

29. The method according to any one of the preceding items, wherein the concentration of the one or more polyphenol compounds after adding to the dairy based product is between 0.01 to 0.25 wt %, such as 0.05 to 0.20 wt %, such as 0.08 to 0.15 wt %, such as 0.1 wt %.

30. The method according to any one of items 1 to 28, wherein the concentration of the one or more polyphenol compound after adding to the dairy based product is no more than 0.25 wt %, such as no more than 0.20 wt %, such as no more than 0.15 wt %, such as no more than 0.10 wt %, such as no more than 0.05 wt %.

31. The method according to any one of items 1 to 28 or 30, wherein the concentration of the one or more polyphenol compound after adding to the dairy based product is at least 0.01 wt %, such as at least 0.05 wt %, such as at least 0.15 wt %, such as at least 0.20 wt %.

32. The method according to any one of the preceding items, wherein the one or more polyphenol compounds is an extract selected from the group consisting of extracts from fruits, vegetables, whole grains, tea, herbs, spices, nuts, seeds, cocoa chocolate and wine.

33. The method according to item 32, wherein the extract is a green tea extract, a grape seed extract or a rosemary extract.

34. The method according to item 32, wherein the extract is a green tea extract.

35. The method according to any one of items 32 to 34, wherein the concentration of the extract after adding to the dairy product is between 0.01 and 0.4 wt %, such as between 0.05 and 0.3 wt %, such as between 0.1 and 0.3 wt %.

36. The method according to any one of items 32 to 34, wherein the concentration of the extract after adding to the dairy product is at least 0.01 wt %, such as at least 0.05 wt %, such as at least 0.1 wt %, such as at least 0.15 wt %, such as at least 0.2 wt %, such as at least 0.25 wt %, such as at least 0.3 wt %.

37. The method according to any one of items 32 to 34 or 36, wherein the concentration of the extract after adding to the dairy product is no more than 0.5 wt %, such as no more than 0.4 wt %, such as no more than 0.35 wt %, such as no more than 0.3 wt %, such as no more than 0.25 wt %.

38. The method according to any one of the preceding items, wherein the active substance in the one or more polyphenol compounds is glycosylated.

39. The method according to any one of the preceding items, wherein the one or more polyphenol compounds is polymerized.

40. A heat treated dairy based product wherein one or more polyphenol compounds have been added.

41. The dairy based product according to item 40, wherein the dairy product is lactose hydrolyzed.

42. The dairy based product according to any one of items 40 to 41, wherein the product is UHT-processed.

43. The dairy based product according to any one of items 40 to 42, wherein the product comprises between 0.01 wt % to 0.25 wt % polyphenol compounds, such as between 0.05 wt % to 0.20 wt %, such as 0.08 wt % to 0.15 wt %, such as 0.1 wt % polyphenol compounds.

44. The dairy based product according to any one of items 40 to 42, wherein the product comprises no more than 0.25 wt % polyphenol compounds, such as no more than 0.20 wt %, such as no more than 0.15 wt %, such as no more than 0.10 wt %, such as no more than 0.05 wt % polyphenol compounds.

45. The dairy based product according to any one of items 40 to 42 or 44, wherein the product comprises at least 0.01 wt % polyphenol compounds, such as at least 0.05 wt %, such as at least 0.15 wt %, such as at least 0.20 wt % polyphenol compounds.

46. The dairy based product according to any one of items 40 to 42, wherein the one or more polyphenol compound is an extract selected from the group consisting of extracts from tea, fruits, vegetables, whole grains, herbs, spices, nuts, seeds, cocoa chocolate and wine.

47. The dairy based product according to item 46, wherein the product comprises between 0.01 and 0.3 wt % extract.

48. The dairy based product according to any one of items 40 to 47, wherein pH is neutral.

49. The dairy based product according to any one of items 40 to 47, wherein pH is in the range of 6.0 to 7.5, such as 6.6 to 7.0.

50. The dairy based product according to any one of items 40 to 47, wherein pH is in the range of 4.0 to 5.0, such as 4.2 to 4.6.

51. The dairy based product according to any one of items 40 to 47 or A, wherein the dairy based product is a fermented drinkable dairy beverage.

52. The dairy product according to any one of items 28 to 31, wherein the product has a shelf life of at least 6 months, such as at least 12 months, such as at least 18 months, such as at least 24 months, such as at least 30 months, such as at least 36 months without significant physical instability.

53. The dairy product according to any one of items 28 to 32, wherein the product has been stored for at least 6 months after addition of the one or more polyphenol compounds, such as at least 12 months, such as at least 18 months, such as at least 24 months, such as at least 30 months, such as at least 36 months after addition of the one or more polyphenol compounds.

The invention claimed is:

1. An Ultra High Temperature (UHT)-processed liquid dairy product comprising a dairy base and one or more polyphenol compounds, wherein the one or more polyphenol compounds comprise epigallocatechin gallate (EGCG), wherein the UHT-processed liquid dairy product comprises between 0.08 wt % to 0.25 wt % of the one or more polyphenol compounds, wherein UHT processing involves preheating at 80-95° C. for 30-240 seconds and treatment at 130-160° C. for 0.1-10 seconds, and wherein the UHT-processed liquid dairy product has a shelf life of at least 6 months.

2. The UHT-processed liquid dairy product according to claim 1, wherein the dairy base is lactose hydrolyzed.

3. The UHT-processed liquid dairy product according to claim 1, wherein the dairy base is selected from the group consisting of whole fresh milk, milk cream, reduced-fat milk, low-fat milk, semi skimmed milk, skimmed milk/non-fat milk, organic milk, heat treated milk, raw unfiltered milk, homogenized milk, filtered milk, recombined dairy products, chemically acidified dairy products and fermented dairy products.

4. The UHT-processed liquid dairy product according to claim 1, wherein the dairy base is a liquid, a beverage, or a milk product.

5. The UHT-processed liquid dairy product according to claim 1 wherein the one or more polyphenol compounds is present in an extract of tea.

6. The UHT-processed liquid dairy product according to claim 1 wherein the one or more polyphenol compounds is present in a green tea extract.

7. The UHT-processed liquid dairy product according to claim 1, wherein the UHT-processed liquid dairy product has a shelf life of at least 12 months.

8. The UHT-processed liquid dairy product according to claim 1, wherein the UHT-processed liquid dairy product has a shelf life of at least 18 months.

9. The UHT-processed liquid dairy product according to claim 1, wherein the UHT-processed liquid dairy product has a shelf life of at least 24 months.

10. The UHT-processed liquid dairy product according to claim 1, wherein the UHT-processed liquid dairy product has a shelf life of at least 30 months.

* * * * *